US00RE34436E

United States Patent [19]

Baird et al.

[11] E Patent Number: Re. 34,436

[45] Reissued Date of Patent: Nov. 9, 1993

[54] COKE OVEN DOOR JAMB CLEANER

[75] Inventors: William R. Baird; Billy C. Baird, both of Sturgis, Ky.

[73] Assignee: Saturn Machine & Welding Co., Inc., Sturgis, Ky.

[21] Appl. No.: 805,587

[22] Filed: Dec. 10, 1991

Related U.S. Patent Documents

Reissue of:

[64] Patent No.: 4,990,221
Issued: Feb. 5, 1991
Appl. No.: 68,407
Filed: Jul. 1, 1987

[51] Int. Cl.[5] ..... C10B 43/04

[52] U.S. Cl. ..... 202/241; 15/93.2

[58] Field of Search ..... 202/241; 15/93.2; 105/29.1; 104/165

[56] References Cited

U.S. PATENT DOCUMENTS

| | | | |
|---|---|---|---|
| 4,063,650 | 12/1977 | Homer | 105/29.1 |
| 4,110,171 | 8/1978 | Baird et al. | 202/241 |
| 4,135,948 | 1/1979 | Mertens et al. | 202/241 |
| 4,300,257 | 11/1981 | Ibe et al. | 202/241 |
| 4,344,204 | 8/1982 | Fujita et al. | 15/93.2 |
| 4,375,389 | 3/1983 | Lindgren | 202/241 |

FOREIGN PATENT DOCUMENTS

| | | | |
|---|---|---|---|
| 3129226 | 3/1983 | Fed. Rep. of Germany | 202/241 |

*Primary Examiner*—Joye L. Woodard
*Attorney, Agent, or Firm*—Wood, Herron & Evans

[57] ABSTRACT

A coke over door jamb cleaner utilizing a unique supporting arrangement, scraper-type cleaning elements and a floor or hearth cleaning tool for effectively cleaning the sealing surfaces of a coke oven door jamb and the floor or hearth of the coke oven adjacent the door.

13 Claims, 9 Drawing Sheets

COKE OVEN DOOR JAMB CLEANER

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a coke oven door jamb cleaner utilizing a unique supporting arrangement, scraper-type cleaning elements and a floor or hearth cleaning tool for effectively cleaning the sealing surfaces of a coke oven door jamb and the floor or hearth of the coke oven adjacent the door.

2. Information Disclosure Statement

Prior U.S. Pat. No. 4,110,171 issued Aug. 29, 1978 discloses a jamb cleaner for a coke oven door jamb utilizing electrically operated screw jack type of supporting arrangement, vertically movable carriage and rotatable cleaning elements. The structural features disclosed in this patent and all of the other patents of record therein, which are incorporated herein by reference thereto, are not equivalent to the structure incorporated into this invention.

SUMMARY OF THE INVENTION

An object of the present invention is to provide a coke oven door jamb cleaner including a vertically oriented support structure or main frame having a carriage vertically movable thereon with scraper tools carried by an extendable and retractable cleaning head with the movable components being hydraulically powered.

Another object of the invention is to provide a coke oven door jamb cleaner in accordance with the preceding object in which the cleaner also includes a floor or hearth cleaning tool for cleaning the hearth at the bottom of the door jamb with the floor cleaning tool being automatically actuated when a cleaning head reaches a lower limit of movement with the floor cleaning tool including a ram that extends a scraper outwardly over the hearth and then retracts it so that the floor cleaning tool will scrape and clean the hearth adjacent the door jamb.

A further object of the invention is to provide a coke oven door jamb cleaner in accordance with the preceding objects in which the main support structure has the capability to pivot slightly about a vertical axis and automatically realign itself with pivot springs being provided to obtain necessary tension on the pivot for allowing such pivotal movement and reducing rigidity.

Yet another object of the invention is to provide a coke oven door jamb cleaner in accordance with the preceding objects for cleaning carbon from the door jambs of coke ovens with the device being easy to install, operate and maintain and being relatively simple in construction. In addition, the cleaner is especially constructed to effectively clean warped jambs, leaning jambs, various sizes and designs of jambs and on both the pusher side and coke side of the coke oven battery.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
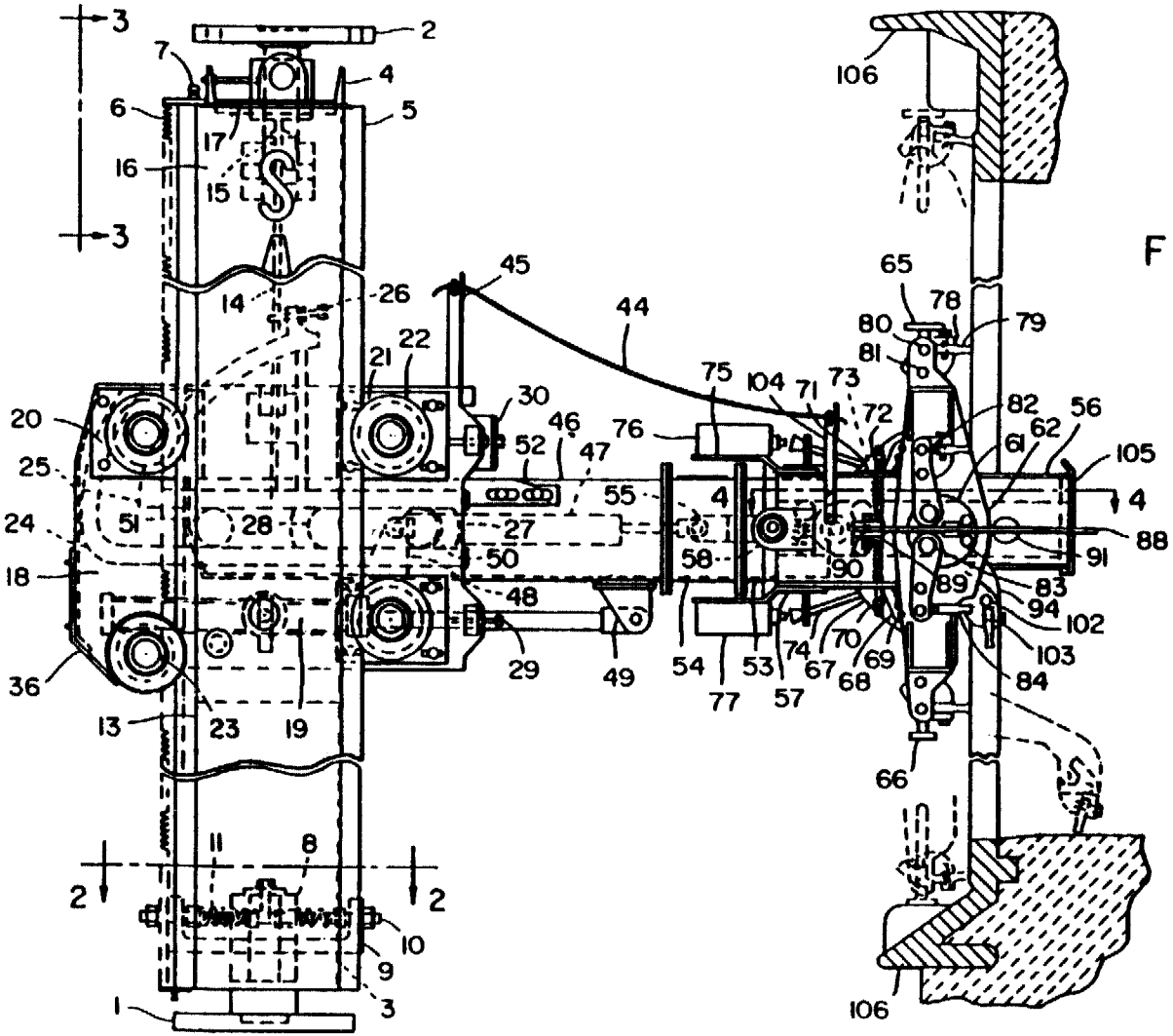
FIG. 1 is a side elevational view of the coke oven door jamb cleaner illustrating the relationship of the components of the invention with extended positions of certain of the components being shown in broken line.

Referring now specifically to the drawings, vertically disposed main support column 12 is rigidly fixed with respect to a lower support plate 3 and an upper support plate 4 which support a lower pivot plate 1 and an upper pivot plate 2 for support from the pusher side or coke side of a jamb 106. Guide rails 5 extend vertically of the column 12 as illustrated in FIG. 2 and elongated rack gears 6 extend throughout the length of the column 12 for vertical adjustment between the guide rails 5 by the use of upper and lower adjustment screws 7.

Figure 2:
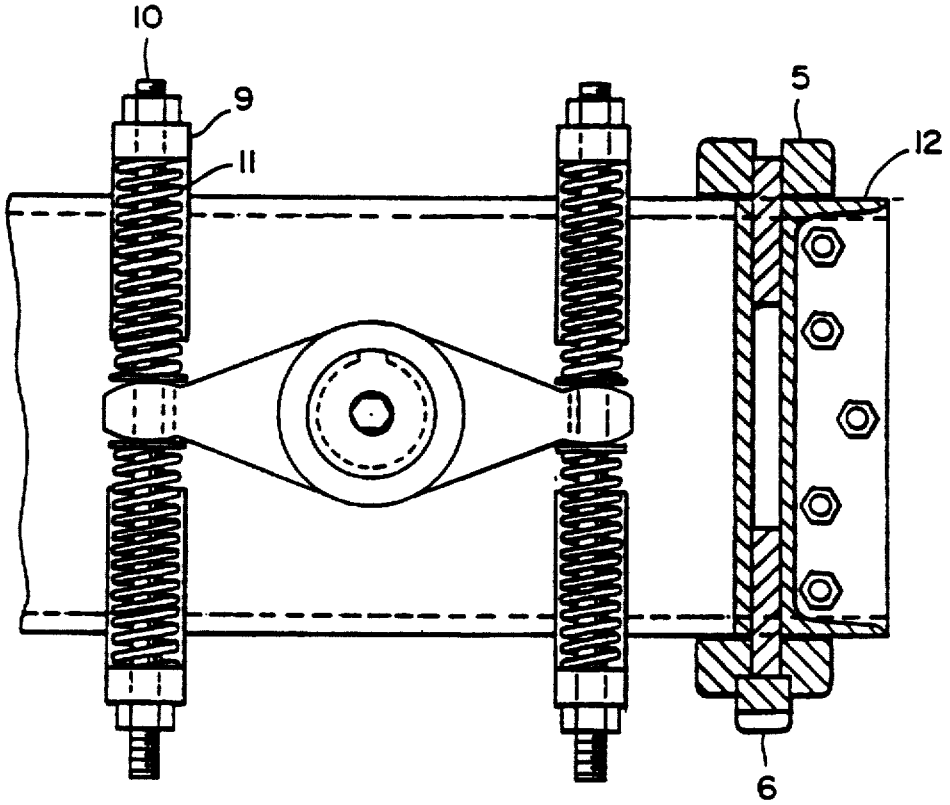
FIG. 2 is a transverse, sectional view taken along section line 2—2 on FIG. 1.

A pivot 8 is connected with support plate 1 and engages pivot springs 11 mounted on pivot rod 10 which has a pivot stop angle 9 mounted thereon as illustrated in the lower portion of FIG. 1 and FIG. 2. This structure enables the column 12 and the main support structure to slightly pivot about a vertical axis and to automatically realign itself due to the laterally extending components on the pivot 8 engaging the springs 11 with the upper support plate 4 also being pivotally connected with the upper pivot plate 2. This structure differs from that shown in U.S. Pat. No. 4,110,171 since it introduces the capability of pivoting the support column and also eliminates the screw jack arrangement at the bottom of the column.

Figure 3:
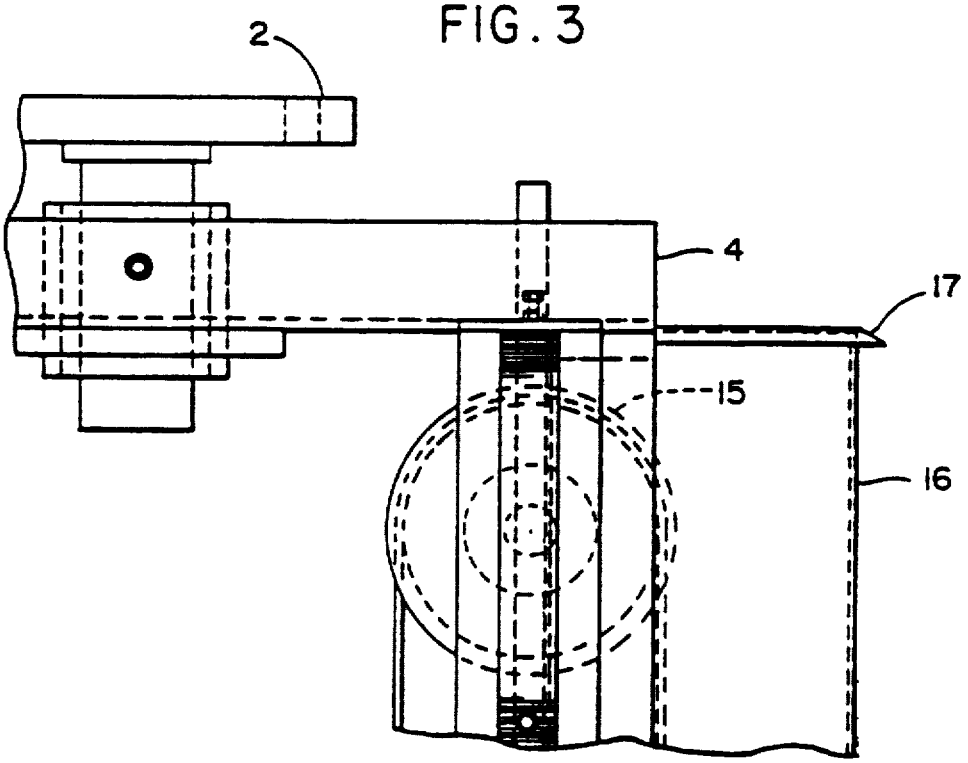
FIG. 3 is an elevational view taken along reference line 3—3 on FIG. 1.

Vertically movable on the column 12 is a carriage including a housing 18 including flanged guide wheels 22 which engage and are guided by the guide rails 5. Four guide wheels are provided at each side of the carriage housing with the wheels 22 at one end of the housing being mounted by non-adjustable mounts 20 and the wheels 22 at the other end of the housing 18, remote from the rack gear 6, being adjustable by the use of slots and bolts to maintain the guide wheels in engaging relation with the guide rails. The carriage and associated cleaning head is movable vertically and the weight of the movable assembly is connected to a counterweight 13 by a counterweight cable 14 that is entrained over a counterweight cable pulley 15 at the upper end of the column with the counterweight 13 being provided with a cover 16 and the upper end thereof is provided with a rain cover 17 as illustrated in FIG. 3. The lowermost pair of guide wheels 22 which are associated with the rack gear 6 have a carrige drive gear 23 mounted centrally thereof which is in meshing engagement with the rack gear 6 and which is driven by a hydraulically powered carriage drive motor 31 through a carriage drive sprocket 32, drive chain 33 and carriage drive shaft 34 which extends between the drive gears 23 with suitable bearings 35 supporting the drive shaft 34 and a chain guard 36 enclosing the drive chain 33.

With this structure, the carriage housing 18 is moved vertically on the column 12 with the counterweight 13 counterbalancing a portion of the weight of the vertical movable carriage housing and associated structure.

Figure 5:
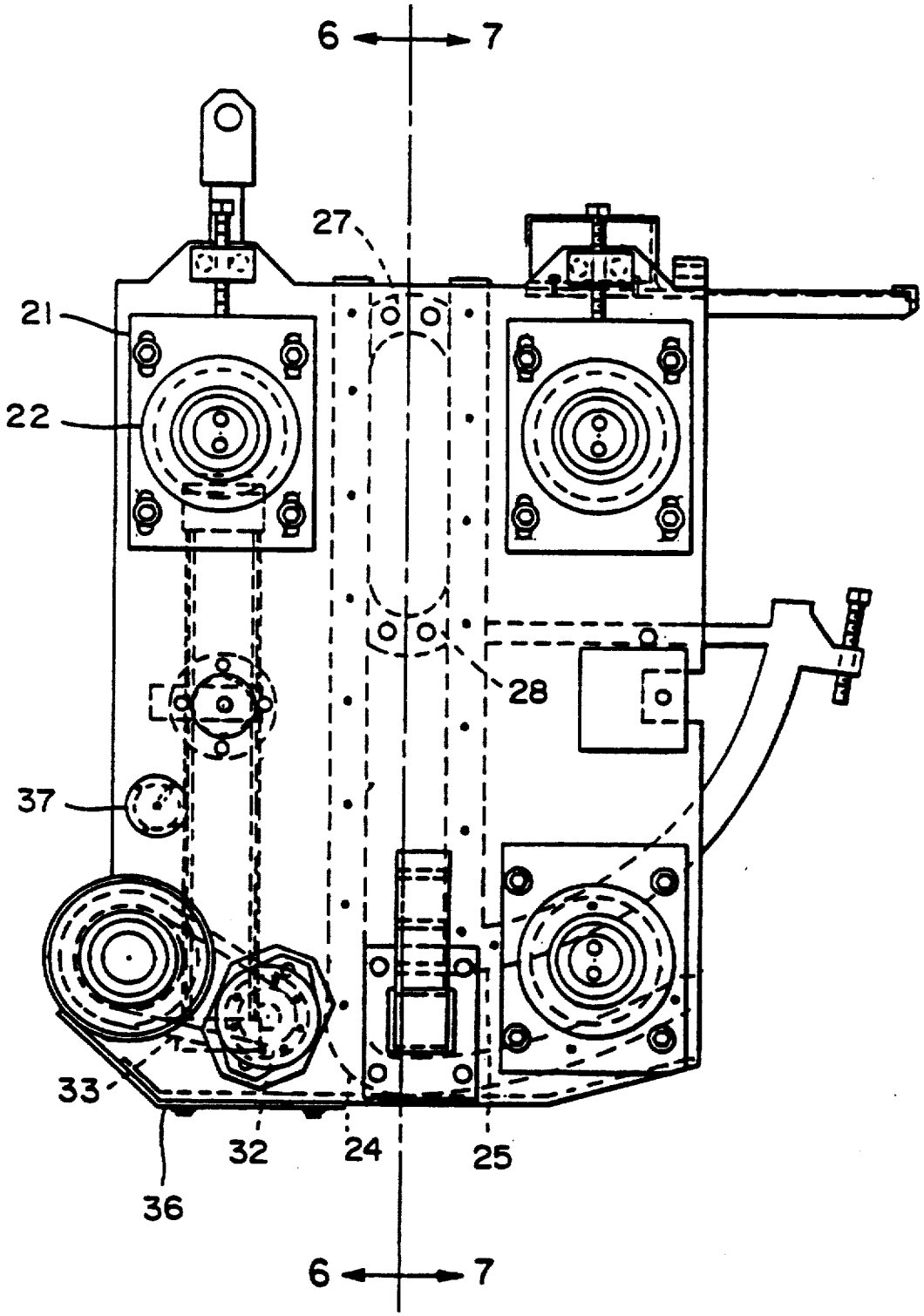
FIG. 5 is an enlarged side elevational view of the carriage.
Figure 6:
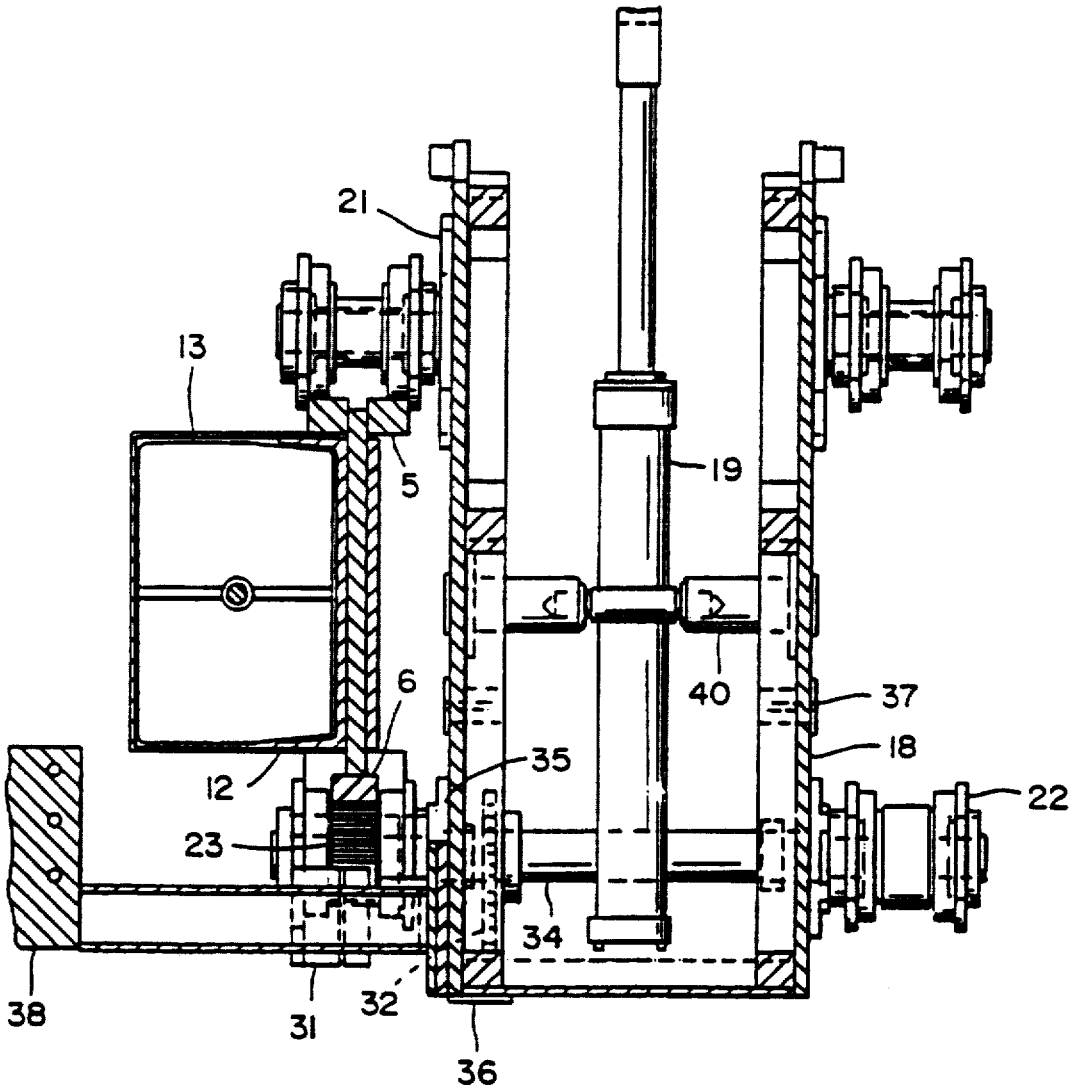
FIG. 6 is a sectional view taken along section line 6—6 on FIG. 5 illustrating further structural details of the carriage.

Mounted longitudinally near the lower portion of the carriage housing 18 is an oven travel ram 19 that is supported by an oven travel ram mount 40 connected with the carriage housing 18. The carriage housing 18 includes a lower oven travel track 24 having an upwardly extending end portion adjacent the end of the carriage having the drive wheels 23 thereon and an upper oven travel track 25 which also has an upwardly extending end portion which extends upwardly above the top of the carriage housing 18 as illustrated in FIGS. 1 and 5 with the terminal end of the upper track including an adjustable oven travel retract stop 26 with the tracks 24 and 25 including a forward or front oven travel roller stop 27 and a rear oven travel roller stop 28 with the stops 27 and 28 being associated with an oven travel front guide roller 50 located between the stops 27 and 28 for movement therebetween with the track also receiving a rear oven travel guide roller 51 which can move upwardly between the extended ends of tracks 24 and 25. An oven travel limit switch 30 is mounted on the forward end of the carriage housing 18 and includes an actuator engageable with an oven travel limit switch actuator 52. As illustrated in FIG. 1, the forward end of the ram 19 is connected to a cleaning head support tube 46 through a connecting mount 49 so that extension and retraction of the ram 19 will cause extension and retraction of the cleaning head support tube 46 and movement of the rollers and tracks in relation to each other within the limits defined by the stops 27 and 28 engaged by the front roller 50.

Figure 7:
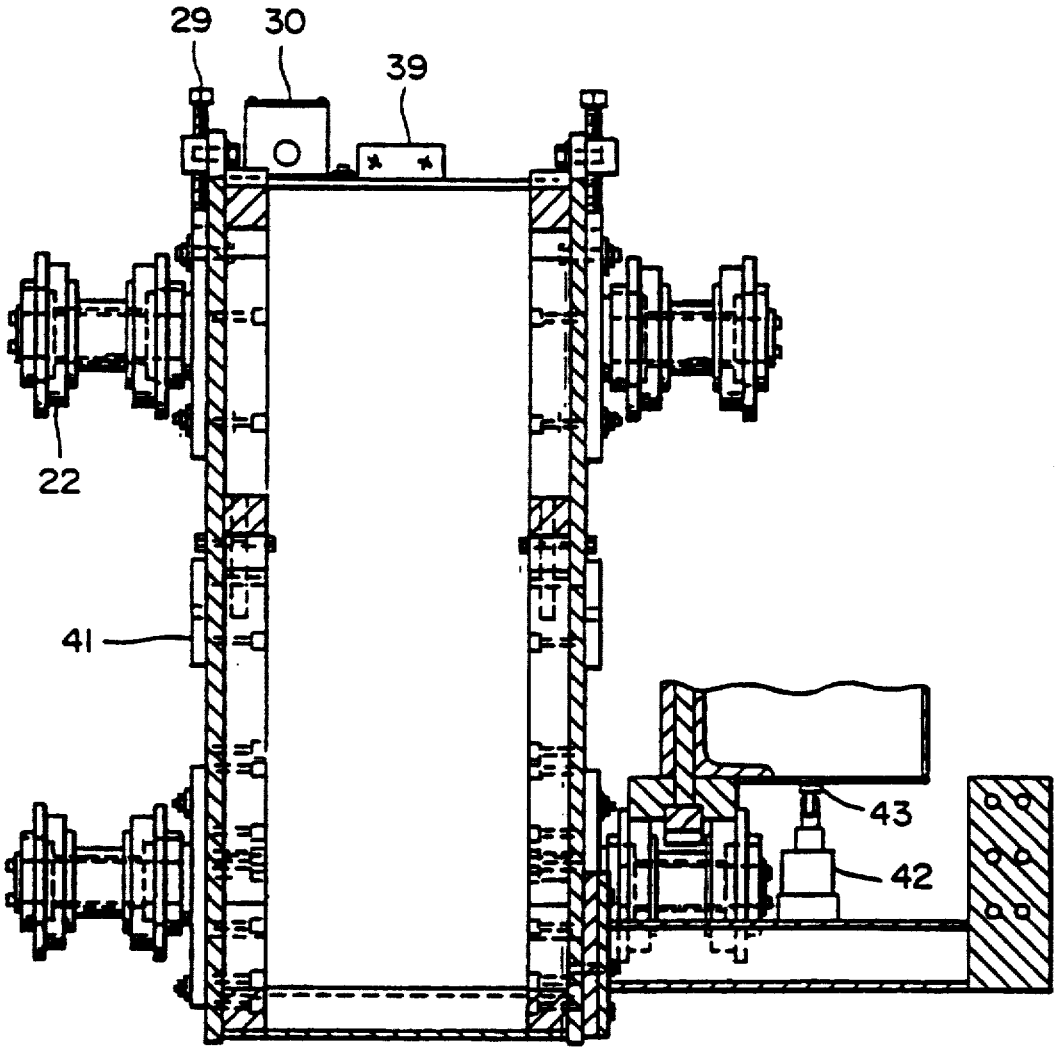
FIG. 7 is a sectional view taken along section line 7—7 on FIG. 5 illustrating further structural details of the carriage.

The adjustable guide wheel mounts 21 are adjusted by the use of an adjustable screw 29 to slide the bearing structures longitudinally in relation to the carriage housing 18. The counterweight cable 14 is connected to the housing 18 by a counterweight cable connecting plate 41 as illustrated in FIGS. 5 and 7 in which the plates 41 are secured adjacent the upper edge portion of the carriage housing 18.

Hydraulic fittings 37 and 39 are provided on the housing 18 and a hydraulic manifold 38 is provided for supplying hydraulic fluid to the fittings, hydraulic motor and ram. As illustrated in FIG. 7, a cycle timer switch 42 and a cycle timer switch actuator 43 are provided on the carriage for engagement with the column for controlling the cycle of movement of the carriage.

The area of the cleaner forwardly of the carriage housing 18 includes a flexible heat shield blanket 44 having the ends thereof supported by vertically extending blanket hangers or brackets 45 and 104 with the hanger bracket 45 being connected to the carriage and the hanger bracket 104 being connected to the cleaning head support tube 46.

Figure 4:
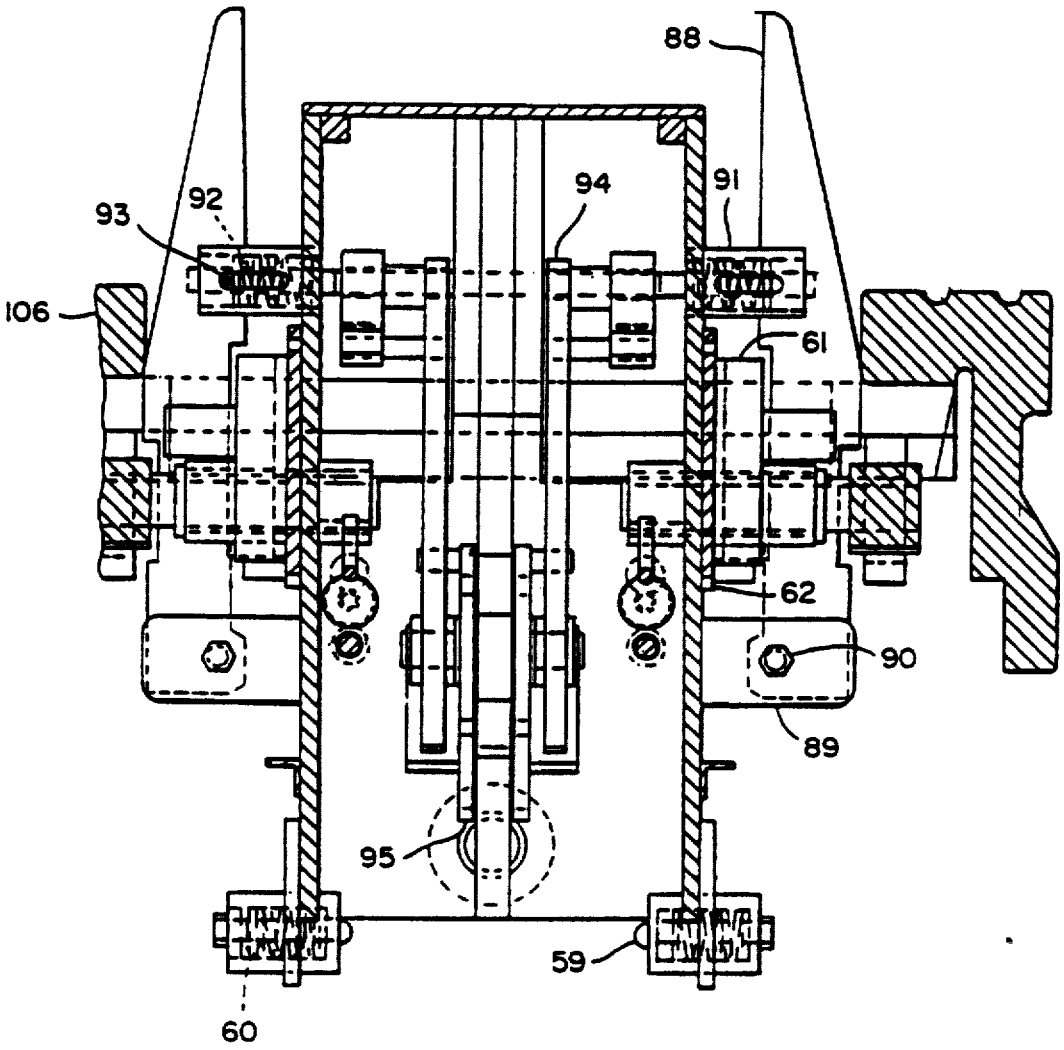
FIG. 4 is a longitudinal sectional view taken along section line 4—4 on FIG. 1 illustrating structural details of the cleaning head.
Figure 8:
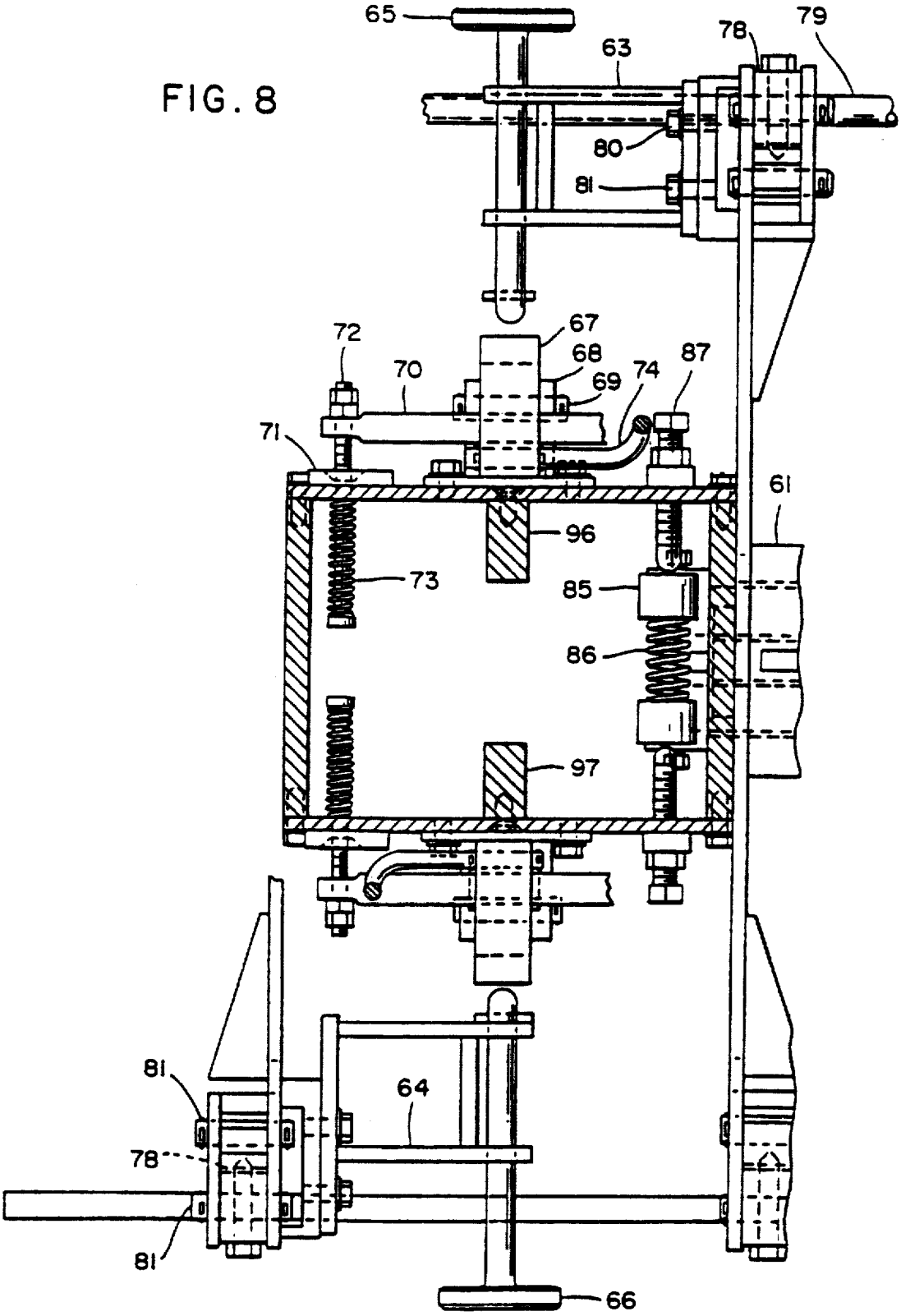
FIG. 8 is a transverse sectional view of the cleaning head support arm illustrating the structural assembly of the cleaning head.
Figure 9:
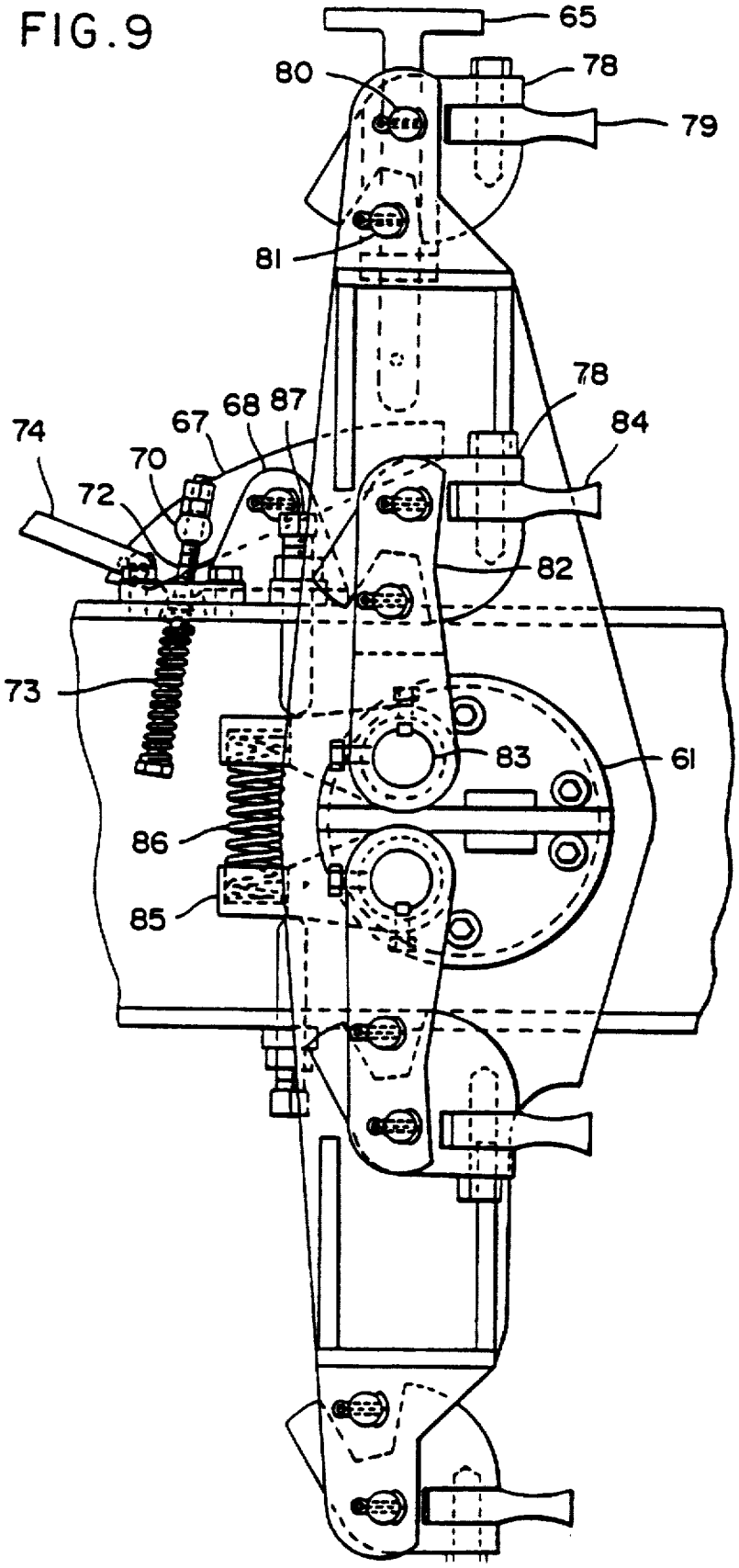
FIG. 9 is an enlarged side elevational view of the cleaning head.

Supported at the outer end of the cleaning head support tube 46 is a cleaner head housing 56 as illustrated in FIGS. 1, 4, 8 and 9 with the housing 56 being engaged with a front section 53 of the cleaning head support tube which is connected to the head support tube by a tube extension 54. The cleaner head 56 is provided with a head pivot 57 and head alignment mounts 58 as illustrated in FIG. 1 and head alignment plungers 59 and head alignment springs 60 as illustrated in FIG. 4. A main tool arm 62 is mounted from the housing 56 by main tool arm pivot mount 61. The main tool arm supports a main or primary cleaning tool 79 at each end thereof in the form of a scraping blade supported by a cleaning tool holder 78 which includes a mounting bolt structure with the tool holder being supported by a tool holder pivot pin 80 and a tool holder pivot stop pin 81 as illustrated in FIGS. 1, 8 and 9. With this construction, each tool holder 78 can pivot about the pivot pin 80 within the limits defined by the pivot pin stop 81 that is received in a notch in the tool holder 78. The tool arm 82 includes a secondary cleaning tool arm 82 mounted on a secondary tool arm shaft 83 for supporting a secondary cleaning tool 84 that is associated with a secondary tool spring holder 85 and a secondary tool spring 86 and a secondary spring adjustment pin 87 as illustrated in FIGS. 8 and 9.

Also mounted longitudinally on the cleaning head housing 56 is a pair of inside cleaning tools 88 supported by an inside cleaning tool mount 89 including a pivot pin 90. The inside cleaning tools 88 are associated with spring housings 91 including a tension spring 92 therein and an inside cleaning tool retaining pin 93 as illustrated in FIGS. 4 and 8 for biasing the inside cleaning tools 88 outwardly about pivot pins 90 with the outer edges of the inside cleaning tools 88 being bevelled or inclined inwardly toward their outer ends.

Figure 10:
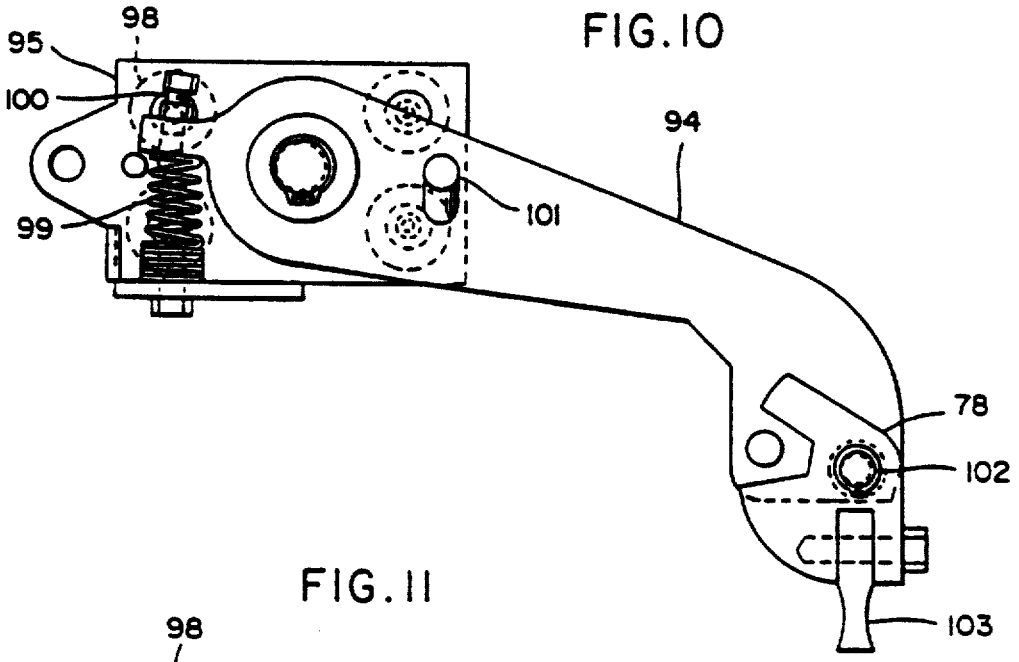
FIG. 10 is a detailed elevational view of the floor cleaning tool.
Figure 11:
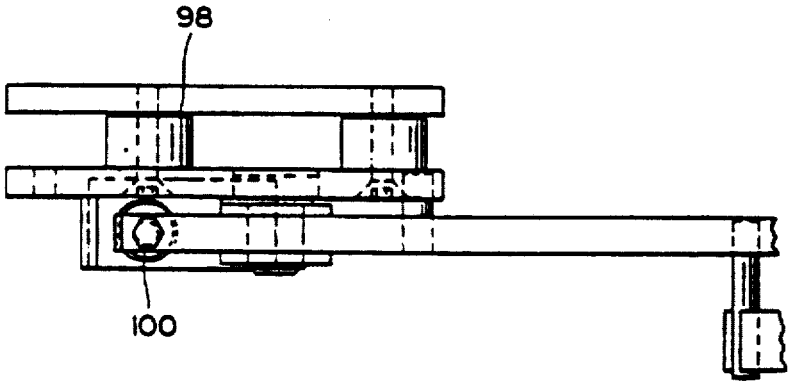
FIG. 11 is a plan view of the hearth cleaning arm and tool.
Figure 12:
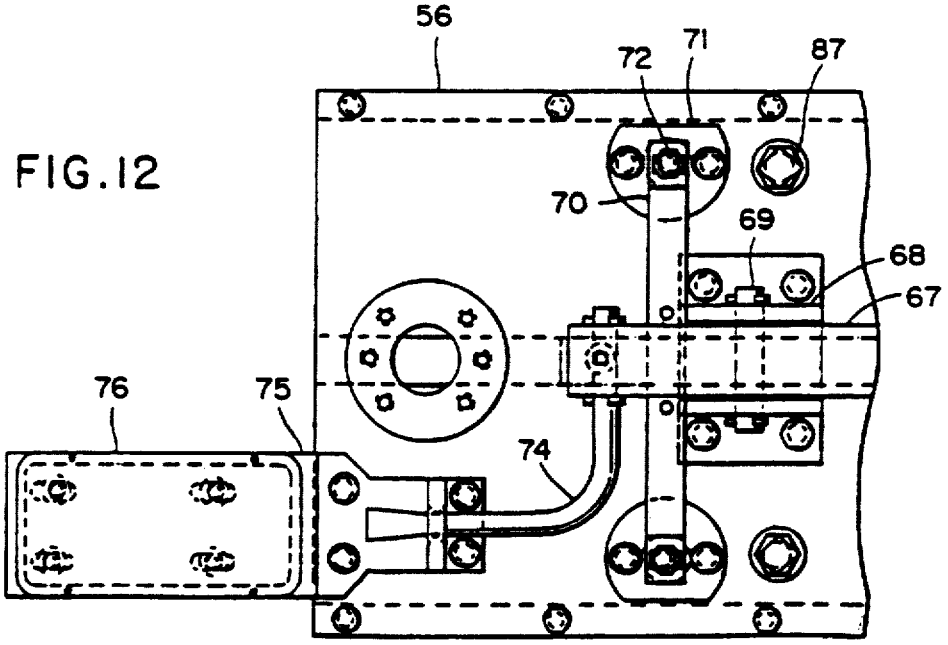
FIG. 12 is a plan view of a portion of the support arm for the cleaning head illustrating limit switch structure associated therewith.

Also mounted on the cleaning head housing 56 is a floor cleaning tool arm 94 as illustrated in FIG. 10 which includes a cleaning tool support 78 at the outer end thereof for supporting the floor cleaning tool 103 for pivotal movement about floor cleaning tool holder pivot pin 102 to enable the tool 103 to clean the floor or hearth of the coke oven when in the dotted line position illustrated in FIG. 1. The floor cleaning tool arm 94 is supported from a floor cleaning tool carrier 95 having upper and lower floor tool carrier rollers 98 which engage upper guide rails 96 and lower guide rails 97. The end of the arm 94 remote from the scraping tool 103 includes a projection engaging a floor tool spring 99 and an adjustable spring bolt 100 to bias the arm 94 with the free end thereof being biased toward the hearth of the coke oven with the floor tool arm limit pin 101 limiting the arcuate movement of the arm 94 about its pivot mount.

The outer end or forward end of the cleaner head housing 56 is provided with a closure plate 105 with an inclined edge as illustrated in FIG. 1 so that it will slide off of the door jamb 106 in the event it comes into contact with the jamb when the cleaner is inserted into the door jamb so that the scraper-type cleaning elements can engage and clean the sealing surface of the door jamb 106. A control arrangement is provided for limiting the movement of the carriage and cleaner head upwardly and downwardly and includes an upper limit switch 76 and a lower limit switch 77 mounted on the cleaning head housing 56 where it joins with the cleaning head support tube 46 as illustrated in FIG. 1. The upper and lower end of the cleaning head arm 62 includes an upper limit switch actuator rod 65 and a lower limit switch actuator rod 66 supported by upper limit switch actuator rod guides 63 and lower limit switch actuator rod guides 64 as illustrated in FIG. 8. The inner end of the actuator rod 65 engages a limit switch tumbler 67 supported by a tumbler mount 68 from the cleaning head housing 56 as illustrated in FIGS. 8 and 9 with the tumbler being pivotal by pivot pin 69 with a tumbler return shaft 70 extending therethrough and laterally thereof in spaced relation to the pivot pin 69. The tumbler return shaft 70 is connected with a tumbler return spring rod 72 extending through a tumbler return spring rod guide 71. A tumbler return spring 73 is mounted on the rod 72 and thus biases the return shaft 70 downwardly toward the cleaning head housing 56 thus returning the tumbler 74 to an upper position. An arcuate or fantail rod 74 is connected to the tumbler and the limit switch 76 with a fantail rod guide 75 retaining these components in assembled relation so that the upper limit switch 76 will be actuated when the upper switch actuator rod 65 is moved downwardly when the cleaning tool arm 62 moves to its upper limit of movement for properly limiting and positioning the upper scraper element 79 with respect to the upper end of the door jamb 106. The tumbler and limit switch structure are duplicated at the lower end of the cleaner head housing 56 for actuating the limit switch 77 in the same manner.

The floor scraper arm 94 is actuated by a floor scraper ram 47 positioned in the cleaning head support tube 46 as illustrated in FIG. 1 with the ram being supported by a ram mount 48 and connected to the floor tool carrier 95 by an extension 55 in the form of a yoke that pivotally connects the piston rod forming part of the ram 47 with the floor tool arm 94. The purpose of the floor cleaning tool 103 is to scrape clean the hearth at the bottom of the door jamb for a distance extending approximately 18" into the oven. The floor cleaning tool 103 that is attached to the arm 94 is extended outward and retracted by the floor scraper ram 47. As the cleaning head reaches the bottom of the jamb 106 during the cleaning cycle, the lower limit switch actuator rod 66 is activated thus stopping the cleaning head for a predetermined amount of time established by an electric timer and setting in motion the floor scraper ram 47 which is extended outwardly over the hearth and then retracting the floor cleaning tool 103 while in contact with the hearth thereby scraping clean the surface of the hearth. The movement of the arm 94 is controlled by the upper and lower guide rails 96 and 97 located centrally in the housing 56 as illustrated in FIG. 8 and the carrier rollers 98 mounted on the floor tool carrier 95 with the pin 101 limiting the movement of the arm 94 and the spring 99 biasing the floor tool 103 toward the hearth when the arm 94 is extended by the ram 47.

One of the major improvements is incorporated into the present invention is the elimination of rotatable cleaning tools disclosed in the aforementioned prior patent. The scraper tools 79 and 103 provide a much simpler construction even though the scraper tools, in some instances, are spring biased into engagement with the surfaces being scraped. The method of extending and retracting the cleaning head mounted on the housing 56 utilizing the ram 19 and associated track and roller structure is substantially the same as that employed in the aforementioned prior patent with the actual positioning for cleaning the jamb being controlled by the oven travel limit switch 30. The scraper tools 79 and 103 and the inside cleaning tools 88 and the secondary scraping tools 84 provide an efficient arrangement for effectively cleaning the surfaces of the jamb as well as the hearth extending inwardly at the floor of the coke oven.

The main support column 12 and the manner in which it is supported by the plates 1 and 2 and spring structure illustrated in FIG. 2 provides the capability of the main support structure to slightly pivot about a vertical axis and automatically realign itself to an original position. The pivot springs 11 provide the necessary tension on the pivot 8 to allow pivotal movement thus reducing rigidity but returning the main structure to an original position.

The vertical movement of the carriage 18 on the guide rails 5 and the drive gear 23 is powered by the hydraulic carriage motor 31 which drives the carriage drive sprocket 32, drive chain 33 and drive shaft 34 with reversing operation of the carriage motor being effected by the upper limit switch 76 and lower limit switch 77 actuated by the upper control rod 65 and lower control rod 66 through an electrical panel to the hydraulic motor 31. Thus, while the carriage still moves vertically on the main support structure, the structural arrangement to accomplish this is substantially different and provides a significantly smoother operation and a structure which is substantially simplified. The use of hydraulic motors simplifies the structure even though electric limit switches are employed for controlling positioning and movement of the carriage and cleaning head with hydraulic power moving the carriage vertically on the main support structure and extending and retracting the various cleaning components carried by the cleaner head 56.

The jamb cleaner as disclosed is relatively simple to install and easy to operate and maintain and is especially adapted to clean warped or leaning door jambs from top to bottom and also clean the inside portion of the jamb and a portion of the hearth of the coke oven at the lower end of the jamb. The jamb cleaner as disclosed may work on both the pusher side and the coke side of the coke oven bottery and can be easily installed on various types of door and pusher machines and it can be fitted to clean jambs of various sizes and designs. Essentially, the vertical main supporting frame structure provides support for the vertically movable cleaner head carriage which includes a drive gear powered by a hydraulic motor for moving the carriage up and down on the main frame. A suitable hydraulic power source having sufficient working pressure and flow capacity is provided and connected to a hydraulic manifold.

The cleaning head is equipped with six scraper tools for cleaning the jamb face with each of the cleaning tools being easily removed for sharpening or replacement. The two main cleaning tools 79 are bolted to the tool holder 78 at the top and bottom of the tool arm, respectively, with the holder swinging freely around a pivot mount 80 on each side of the head arm or frame. The main cleaning tools are pressed against the face of the jamb by a hydraulic ram which exerts an even pressure on the tools for the full length of the jamb. There are four secondary cleaning tools 84, two on each side of the cleaning arm, which are fastened to arms on shafts installed in the pivot mount. The secondary cleaning tools are spring loaded by spring 86 to spring load the secondary cleaning tools.

A floor cleaning tool 103 scrapes the hearth clean inside the bottom of the door jamb in ovens in which the hearth is generally aligned with the lower portion of the jamb. The main scraping tools, the secondary tools and the floor cleaning tools are constructed to tumble or flip flop and to drag one of their two cutting edges over the surface of the jamb which precludes a positive cut. There are two spring-loaded, inside cleaning tools 88, one on each side of the cleaning head, for cleaning the inside of the jamb 106. The cleaner is equipped with electrical limit switch safeguards that automatically preclude damage to the jamb cleaner and the pusher or coke oven due to an operator mistake or to component malfunction.

While the essential components of the cleaner have been disclosed, it is pointed out that various control procedures may be incorporated by using standard components. For example, a counter device may be located in an electrical control panel to set the number of cleaning cycles that the jamb cleaner will clean a jamb with it being understood that one cleaning cycle means that the cleaning head initially rises from its at rest position and extends into the jamb, cleans the top of the jamb and reverses and cleans to the bottom of the jamb where the cleaning head stops for a period of time allowing for the extension and retraction of the floor cleaning tool to scrape the hearth after which the cleaning head commences its upward travel cleaning the jamb until it reaches its initial cleaning start position where it stops and then retracts back to the rest position. Since the cleaning head must pass an input pulse micro-switch twice to complete one cleaning cycle, the signal counter should be set on two for one cleaning cycle and four for two cleaning cycles. The limit switches 30 for the carriage and 76 and 77 for the cleaning head and limit switches are also provided to lock out travel of the door or pusher machine. The upper limit switch 76 is triggered to automatically reverse the upward travel of the cleaning head and the carriage at the top of the jamb with this switch 76 and the actuator 65 being located at the top of the cleaning head. The lower limit switch 77 and lower actuator serve to automatically reverse the downward travel of the cleaning head and the carriage at the bottom of the jamb. The oven travel limit switch 30 is used to preset the horizontal cleaning position pressure for the cleaning head. After a start button has been pushed, the cleaning head automatically raises to the horizontal position and extends into the jamb and starts its vertical movement just before the scraper tools make contact with the jamb face which smooths the start of the scraper action. Start and stop buttons are provided along with emergency switches and manual control switches are provided along with control switches for solenoid valves in the hydraulic system.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A coke oven door jamb cleaner comprising a generally vertically disposed support column having upper and lower ends, a carriage mounted on said support column for several movement, jamb cleaning means mounted on said carriage for movement therewith and for movement toward and away from a door jamb, said jamb cleaning means including a plurality of scraper elements engaged with a jamb surface during vertical movement of the carriage and jamb cleaning means, and drive means interconnecting the carriage and column for moving the carriage vertically on the column between upper and lower positions, said drive means including a motor on the carriage, a drive pinion gear driven by the motor and an elongated rack gear on the column in meshing engagement with the drive pinion gear for movement of the carriage vertically on the column when the drive pinion gear is driven by the motor, said support column including upper and lower plates engaging opposed supporting surfaces, pivot means connecting the plates to the ends of the column to enable the column to pivot about a generally vertically disposed longitudinal axis, said pivot means including spring means limiting and resisting pivotal movement of the support column and returning the support column to an original position about its longitudinal axis.

2. The coke oven door jamb cleaner as defined in claim 1 wherein said jamb cleaning means includes a support member movably mounted on the carriage, hydraulic ram means connected to the carriage and support member for extending and retracting the support member, a cleaning tool support arm at an outer end of the support member and extending above and below the support member, said scraper elements including primary and secondary scraper blades mounted on the arm above and below the support member with each of the blades being mounted for flip flop pivotal movement for engaging and cleaning a jamb surface when moving in either vertical direction and upper and lower limit means on the jamb cleaning means to limit the upward and downward movement of the jamb cleaning means and carriage.

3. The coke oven door jamb cleaner as defined in claim 2 together with horizontally disposed, outwardly biased cleaning tools mounted on the jamb cleaning means to engage an inside surface of a door jamb to clean said inside surface during vertical movement of the jamb cleaning means.

4. The coke oven door jamb cleaner as defined in claim 1 together with a hearth cleaning tool supported from said carriage, said hearth cleaning tool comprising a scraper blade supported for flip flop pivotal movement about a horizontal axis for scraping engagement with a hearth during reciprocation while in contact therewith, hydraulic ram means connected with the hearth cleaning tool and carriage for extending the tool inwardly in relation to a hearth and then outwardly in relation to a hearth when the carriage is lowered to a position with the hearth scraping blade engaged with a hearth.

5. The coke oven door jamb cleaner as defined in claim 4 wherein said jamb cleaning means includes a support member movably mounted on the carriage, hydraulic ram means connected to the carriage and support member for extending and retracting the support member, a cleaning tool support arm at an outer end of the support member and extending above and below the support member, said scraper elements including primary and secondary scraper blades mounted on the arm above and below the support member with each of the blades being mounted for flip flop pivotal movement for engaging and cleaning a jamb surface when moving in either vertical direction.

6. The coke oven door jamb cleaner as defined in claim 5 together with horizontally disposed, outwardly biased cleaning tools mounted on the jamb cleaning means to engage an inside surface of a door jamb to clean said inside surface during vertical movement of the jamb cleaning means.

7. A coke oven door jamb cleaner comprising a generally vertically disposed support column, a carriage mounted on said support column for vertical movement, jamb cleaning means mounted on said carriage for movement therewith and for movement toward and away from a jamb, said jamb cleaning means including a plurality of scraper elements engaged with a jamb surface during vertical movement of the carriage and jamb cleaning means, and drive means interconnecting the carriage and column for moving the carriage vertically on the column between upper and lower positions, said drive means including a motor on the carriage, a drive pinion gear driven by the motor and an elongated rack gear on the column in meshing engagement with the drive pinion gear for movement of the carriage vertically on the column when the drive pinion gear is driven by the motor, a hearth cleaning tool supported from said carriage, said hearth cleaning tool comprising a scraper blade supported for flip flop pivotal movement about a horizontal axis for scraping engagement with a hearth during reciprocation while in contact therewith, hydraulic ram means connected with the hearth cleaning tool and carriage for extending the tool inwardly in relation to a hearth and then outwardly in relation to a hearth when the carriage is lowered to a position with the hearth scraping blade engaged with a hearth.

8. The coke oven door jamb cleaner as defined in claim 7 wherein said hearth cleaning tool includes an arm having said scraper blade mounted at an outer blade thereof, spring means biasing the arm and blade mounted thereon toward a hearth, guide roller and track means supporting the arm from the carriage for reciprocation, said hydraulic ram connecting said arm and carriage.

9. A coke oven door jamb cleaner having a vertically movable jamb cleaning tool assembly for cleaning jamb surfaces during vertical movement, a hearth cleaning tool mounted on the jamb cleaning assembly and including a generally horizontally disposed scraping blade mounted for flip flop pivotal movement and extension and retraction inwardly and outwardly in relation to a hearth floor for scraping and cleaning said hearth floor, means mounting the hearth cleaning tool in the jamb cleaning tool assembly and causing reciprocatory oscillation thereof when the hearth cleaning tool is in alignment with and in engagement with said hearth floor.

10. The cleaner as defined in claim 9 wherein said hearth cleaning blade is supported by a pivotal arm with the blade at one end thereof, spring means biasing the arm in one direction for biasing the blade into engagement with said hearth floor.

*11. A coke oven door jamb cleaner comprising a generally vertically disposed support column having upper and lower ends, a carriage mounted on said support column for vertical movement, jamb cleaning means mounted on said carriage for movement therewith and for movement toward and away from a door jamb, said jamb cleaning means including a plurality of scraper elements being engagable with a jamb surface during vertical movement of the carriage and jamb cleaning means, and drive means interconnecting the carriage and column for moving the carriage vertically on the column between upper and lower positions, said support column including upper and lower plates engaging opposed supporting surfaces, pivot means connecting the plates to the ends of the column to enable the column to pivot about a generally vertically disposed longitudinal axis, said pivot means including spring means limiting and resisting pivotal movement of the support column and returning the support column to an original position about its longitudinal axis.*

*12. The coke oven door jamb cleaner as defined in claim 11 wherein said jamb cleaning means includes a support member movably mounted on the carriage, hydraulic ram means connected to the carriage and support member for extending and retracting the support member, a cleaning tool support arm at an outer end of the support member and extending above and below the support member, said scraper elements including primary and secondary scraper blades mounted on the arm above and below the support member with each of the blades being mounted for flip flop pivotal movement for engaging and cleaning a jamb surface when moving in either vertical direction and upper and lower limit means on the jamb cleaning means to limit the upward and downward movement of the jamb cleaning means and carriage.*

*13. The coke oven door jamb cleaner as defined in claim 12 together with horizontally disposed, outwardly biased cleaning tools mounted on the jamb cleaning means to engage an inside surface of a door jamb to clean said inside surface during vertical movement of the jamb cleaning means.*

* * * * *